United States Patent

[11] 3,613,860

| [72] | Inventor | Fred L. Waite |
| | | 66 Clinton Place, Massapequa, N.Y. 11758 |
| [21] | Appl. No. | 53,490 |
| [22] | Filed | July 9, 1970 |
| [45] | Patented | Oct. 19, 1971 |

| [54] | UNSCRAMBLING CONVEYOR FOR BAKED GOODS |
| | 10 Claims, 10 Drawing Figs. |
| [52] | U.S. Cl............................................. 198/30, 198/183 |
| [51] | Int. Cl............................................. B65g 47/26 |
| [50] | Field of Search............................... 198/30, 183 |

[56] References Cited
UNITED STATES PATENTS
2,183,433  12/1939  Rheinstrom...................  198/30

*Primary Examiner*—Edward A. Sroka
*Attorney*—J. Bradley Cohn

ABSTRACT: A two section conveyor receives randomly disposed baked goods thereon and delivers them aligned in rows for the simultaneous removal of the first baked goods in the aligned rows, each row being disposed in a path between longitudinal guides. The first section of the conveyor has an upwardly inclined endless belt of rotatably mounted transverse rollers to feed the baked goods thereon with small forward pressure between converging side guides to the second section of the conveyor. The second section of the conveyor has a transverse rotating paddle to knock backward the uppermost of any accidentally stacked baked goods, pivotally mounted oscillating side guides disposed in front of the longitudinal guides forming rows, and vertically mounted driven drums in front of longitudinal guides between adjacent rows. The second section of the conveyor has an endless belt of individually and rotatably mounted short lengths of rollers, a short length of each roller being disposed below each path for an aligned row of baked goods.

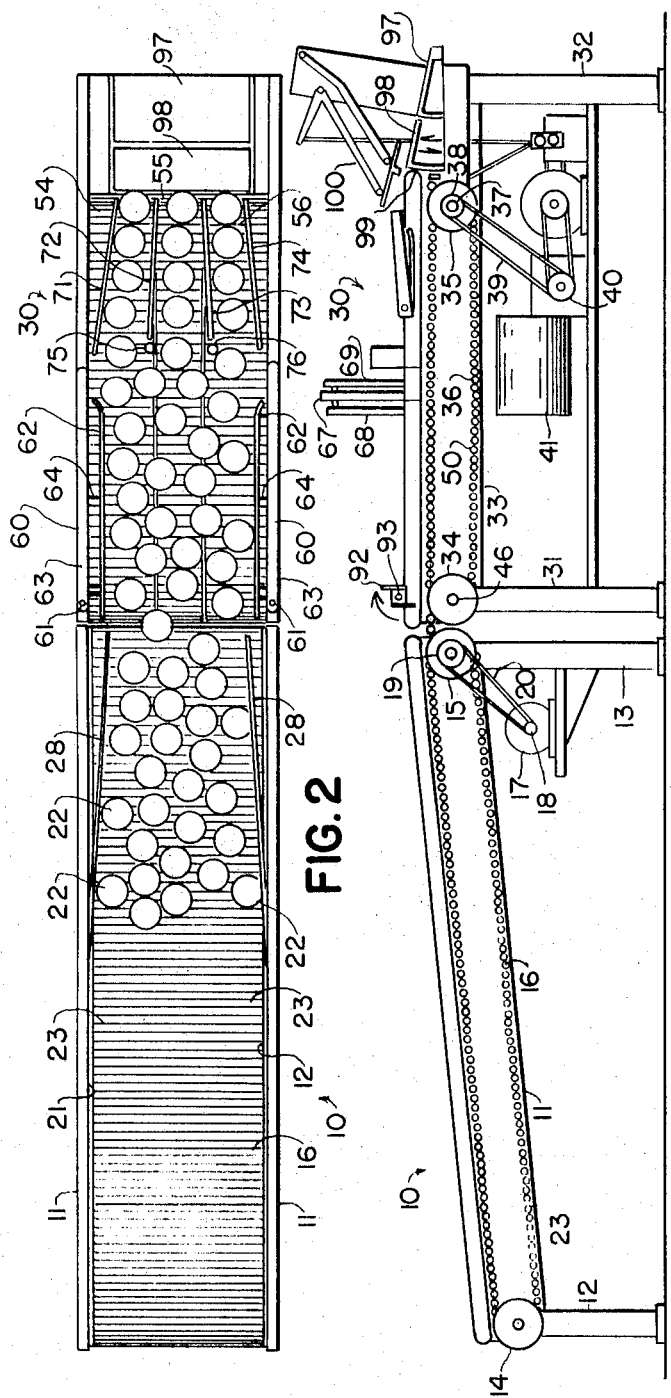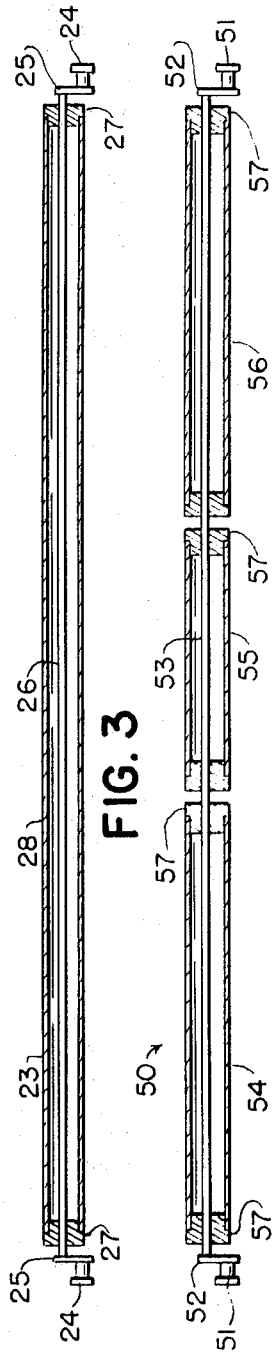

INVENTOR:
FRED L. WAITE

BY

ATTORNEY

UNSCRAMBLING CONVEYOR FOR BAKED GOODS

BACKGROUND OF THE INVENTION

Existing unscrambling delivery conveyors for baked goods, such as donuts or muffins, have not proved satisfactory as they require attention to manually unjam and align moving products. The conveyor of this invention requires no attention and is fully automatic. Further, baked goods are very delicate and vary in their dimensions. This invention handles such baked goods without damage.

SUMMARY OF THE INVENTION

The first section of a two section conveyor receives randomly disposed baked goods thereon. This section has a driven endless belt of rotatably mounted transverse rollers with an upper run moving upward with a slight incline. Gently converging side guides urge the baked goods into a narrower path. Two driven transfer rollers move the baked goods to the second section of the conveyor which has a second driven endless belt of rotatably mounted transverse rollers, each roller having a number of short individually mounted lengths. A transverse rotating paddle disposed above the second section knocks backward the uppermost of any accidentally stacked baked goods to lie flat on the belt. Pivotally mounted oscillating side guides urge the baked goods into a path substantially as wide as the desired number of aligned rows of the goods. Longitudinal guides define final paths within which the baked goods form aligned rows, each row being disposed above and being independently supported by short lengths of said rollers. Vertically mounted driven drums are disposed in front of the longitudinal guides between adjacent rows. The drums and the oscillating side guides ensure that, as a row is filled with baked goods, additional baked goods will be urged laterally to fill any empty spaces in other rows. A stop and means to simultaneously remove the foremost of the aligned baked goods is used in connection with this unscrambling conveyor.

This invention enjoys many advantages. The inclination of the first section of the conveyor can be adjusted so that baked goods thereon are urged forward with a desired very slight pressure. Any stoppage of the flow of baked goods will cause the rollers to rotate below the goods doing them no damage. The rollers rotate easily in the event of a stoppage as the friction to be overcome to rotate the rollers only slightly exceeds the force tending to cause the baked goods to rotate the rollers by sliding down the inclined upper run of the first section of the conveyor. In addition, the first section of the conveyor acts as a product storage area should removal of baked goods from the aligned rows be interrupted. The first section of the conveyor is driven at a lower speed than the second section. The greater width of the second section in front of the converging side guides enables it to maintain a desired rate of product feed and provide product storage.

The second section of the conveyor enables baked goods in one aligned row to be stopped without damage by the rolling of the short lengths of rollers thereunder while baked goods are continued to be carried forward to fill adjacent rows on other independently mounted short lengths. The rotating vertical drums and the pivoted oscillating guides ensure that, after one row is filled, subsequent conveyed baked goods will fill adjacent empty rows without jamming.

The unscrambling conveyor of this invention has proven itself to be completely reliable in its operation in that it will not jam or have stoppages which require the attention of an operator. It is also very gentle with baked goods, such as donuts or muffins, which are delicate and easily damaged.

BRIEF DESCRIPTION OF THE DRAWING

FIG. 1 is a side view of the unscrambling conveyor of this invention with side plates of the first and second sections of the conveyor removed;

FIG. 2 is a top view of the unscrambling conveyor with mounting and drive mechanisms for vertical driven drums, oscillating side guards, and a rotating transverse paddle removed;

FIG. 3 is a longitudinal section taken through a roller as used in the first section of the conveyor;

FIG. 4 is a longitudinal section taken through a roller having independently mounted short lengths as used in the second section of the conveyor;

DESCRIPTION OF THE PREFERRED EMBODIMENT

Figure 5:
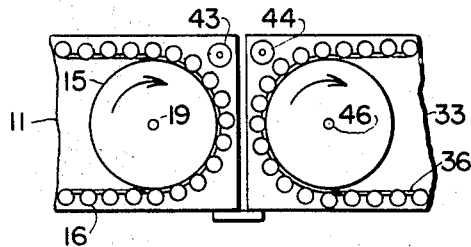
FIG. 5 is a longitudinal vertical section through fragments of the abutting ends of the first and second sections of the conveyor showing driven transfer rollers.

As shown in FIGS. 1 and 2, the unscrambling conveyor has a first section generally designated by the reference numeral 10. First section 10 has two side plates 11 supported by the sets of legs 12 and 13. In FIG. 1, one of the side plates 11 is shown removed. Pairs of rotatably mounted pulleys, sprockets, or the like 14 and 15 have an endless belt 16 passing about them. The belt 16 is driven by the pulleys 15 which are themselves driven by motor 17 by means of drive pulleys 18 and 19 and the belt or chain 20. Side guides 21 contain baked goods 22, such as donuts or muffins, which are disposed in a random manner by conventional apparatus (not shown) or an operator on the belt 16.

Belt 16 is made up of a number of closely spaced transverse rollers 23 which are shown in detail in FIG. 3. Endless chains 24 pass about the pulleys or sprockets 14 and 15. Raised portions 25 of the links of chains 24 have an axle 26 of each roller 23 fixed between them. Bearings 27 of any suitable style or material are disposed about each axle 26 to rotatably support a tubular roller body 28.

The legs 12 should be adjustable in their height so the degree of upward inclination of the upper run of belt 16 may be adjusted. This adjustment regulates the amount of force urging the baked goods forward because, the steeper the inclination of belt 16, the more the baked goods 22 will tend to rotate the rollers 23 to slide downward. The degree of inclination should be set to almost overcome the friction required to rotate the rollers 23 by the downward sliding tendency of given baked goods 22 so that they are delivered with a very small force. Gently converging side guides 28 narrow the flow of conveyed baked goods to approach the width of the number of rows in which they will finally be delivered.

As is further shown in FIGS. 1 and 2, the second section of the conveyor, generally designated by the reference numeral 30, has two sets of legs 31 and 32 supporting the side plates 33 in which are journaled the shafts 46 and 37 of the pairs of sprockets or pulleys 34 and 35. An endless belt 36 of rollers is disposed about the pairs of sprockets 34 and 35. The shaft 37 of sprockets 35 has a pulley 38 mounted thereon to be driven by belt 39 and pulley 40 by means of motor 41.

Figure 6:
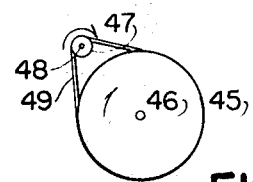
FIG. 6 is a side view of a drive for a transfer roller.

As shown in FIG. 5, a pair of transfer rollers 43 and 44 are disposed between the upper runs of belts 16 and 36. As shown in FIG. 6, a pulley 45 on shaft 46 drives a pulley 47 on shaft 48 by means of a belt 49. Shaft 48 mounts transfer roller 44. Transfer roller 43 is driven in a similar manner.

Belt 36 is composed of rollers 50 as shown in FIG. 4. Chains 51 have raised portions 52 on their links which mount the axles 53. Short lengths of rollers 54, 55 and 56 are rotatably mounted about each axle 53 by means of suitable bearings 57.

Figure 7:
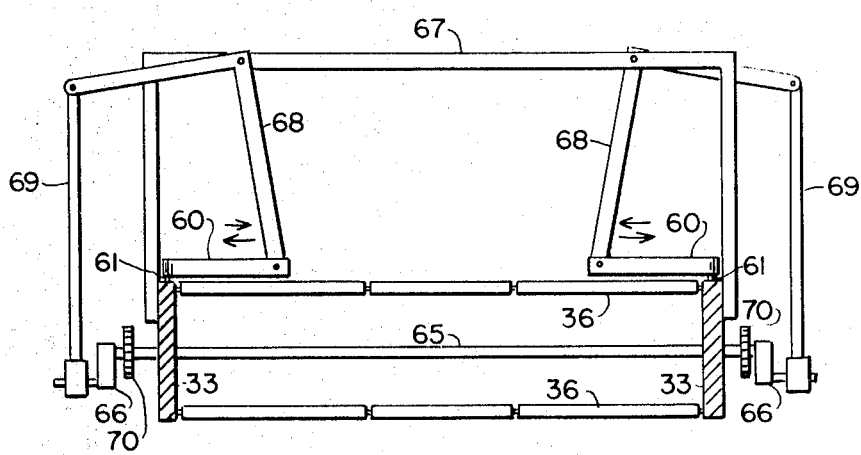
FIG. 7 is a transverse vertical section through the second section of the conveyor showing the oscillating mechanism for the pivoted side guides.

As shown in FIGS. 2 and 7, side members 60 are pivotally mounted at 61 on section 30. Spring member guides 62 are supported by spacers 63 and 64 inside members 60. A shaft 65 journaled in side members 33 has cranks 66 at each end. A frame 67 pivotally mounts two "L" shaped arms 68 each having one horizontal end vertically reciprocated by a connecting rod 69 connected to one of the cranks 66. The lower end of each "L" shaped arm 68 is connected to the free end of a side member 60 to oscillate it. Shaft 65 is driven by at least one sprocket 70.

As shown in FIG. 2, longitudinal guides 71, 72, 73 and 74 define three paths therebetween over the short lengths 54, 55 and 56. The paths defined between the longitudinal guides 71, 72, 73 and 74 taper from about 1½the diameter of baked goods 22 to substantially their diameter at elevator 98. Vertical drums 75 and 76 are disposed in front of the guides 72 and 72.

Figure 8:
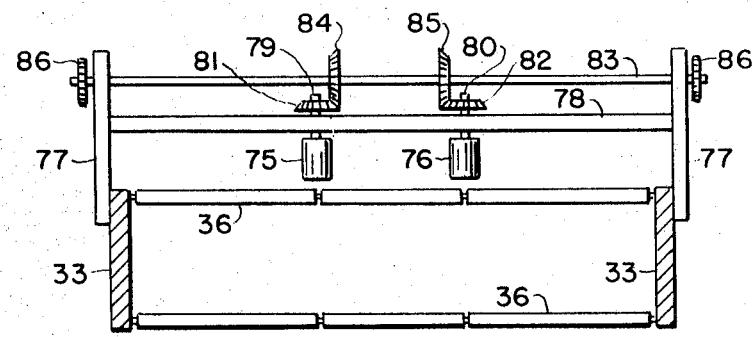
FIG. 8 is a transverse vertical section through the second section of the conveyor showing the mounting and drive mechanism for the vertical drums.

As shown in FIG. 8, supports 77 have a mounting bar 78 extending between them above the belt 36. The drums 75 and 76 are preferably knurled and they are rotatably journaled in bar 78 by means of shafts 79 and 80 which have the bevel gears 81 and 82 mounted thereon. A drive shaft 83 carries the bevel gears 84 and 85 which mesh, respectively, with gears 81 and 82. Shaft 83 carries a sprocket 86 with which it is driven.

Figure 9:
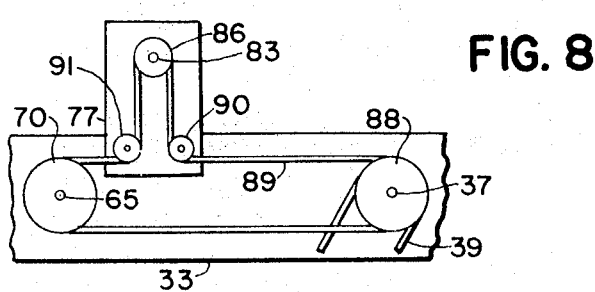
FIG. 9 is a side view of a fragment of the second section of the conveyor showing the drive for the drums and the oscillating side guides.

As shown in FIG. 9, side plates 33 have shaft 37 journaled in them as has been described in connection with FIG. 1. A sprocket 88 on shaft 37 drives sprockets 70 and 86 by means of chain 89 and the idler sprockets 90 and 91.

Figure 10:
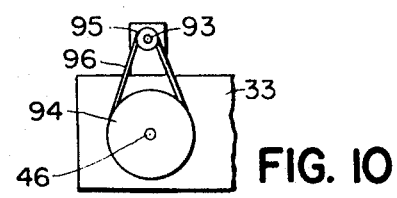
FIG. 10 is a side view of a fragment of the second section of the conveyor showing the drive for a rotating paddle.

A two-bladed paddle 92 mounted on shaft 93 may be driven by a pair of sprockets 94 and 95 and a chain 96, sprocket 94 being mounted on shaft 46 as shown in FIGS. 1 and 10. The paddle 92 knocks the uppermost of any accidentally stacked baked goods 22 backward to lie flat in one layer on belt 36.

As shown in FIGS. 1 and 2, a delivery slide 97 has an elevator 98 with a front edge 99. Front edge 99 acts as a stop when elevator 98 is in an up position to prevent forward motion of the foremost baked goods 22 in the aligned rows between the guides 71-74. To remove the foremost baked goods 22, the elevator 98 moves downward once each cycle of operation to have the three foremost baked goods 22 slide thereon. The elevator 98 ten lifts the baked goods 22 up to the plane of slide 97 from which a pushing mechanism 100 slides the baked goods for a packing operation.

Since the first section 10 serves as a storage conveyor, its speed should be such that a normal supply of baked goods 22 only partially fills it. The length and width of belt 16 of section 10 determine the storage time it makes available in the event of a delay in product removal.

On the second section 30, the spring member guides 62 oscillate so as to constrain three baked goods 22 disposed beside each other and then release them for free passage each cycle of elevator 98. The free ends of the spring member guides 62 should be about 1½ times the diameter of the baked goods 22 from the knurled drums 75 and 76. The drums 75 and 76 are rotated to urge baked goods 22 contacting them outward away from the center. Thus, if a row of aligned baked goods between the guides 71-74 fills up, the combined motion and action of the guides 62 and the drums 75 and 76 will divert additional baked goods 22 laterally to fill empty rows. Since separately mounted short lengths 54-56 are disposed under each row, baked goods 22 can be stopped in one row that is filled while being conveyed forward in an adjacent row. Single moving belt feeds cannot accomplish this without an undesirable friction buildup. The speed of belt 36 should be about four to five times the diameter of the baked goods 22 each cycle to assure the loading of elevator 98. Belt 36 should be driven about twice the speed of belt 16.

While chains and sprockets and belts and pulleys have been described as the drive means of this invention, any suitable equivalent may be used. The unscrambling conveyor is shown aligning baked goods in three rows between the guides 71-74; however, it may be used to align two or more rows as desired. Two unscrambling conveyors may be used in tandem or side by side to double the rate of feed to two delivery slides 97.

What is claimed is:

1. An unscrambling conveyor for baked goods receiving randomly disposed baked goods and aligning the baked goods in a plurality of rows, said unscrambling conveyor comprising, in combination a conveyor section having an endless belt of rollers, each roller having rotatably mounted short lengths adjacent each other, longitudinal guides defining a path therebetween for each row of aligned baked goods at the end of said conveyor section, said short lengths of rollers being disposed under each of said paths, pivotally mounted side guides disposed in front of said longitudinal guides, a vertically mounted drum disposed in front of each longitudinal guide between adjacent paths, means stopping and removing the foremost baked goods in the aligned rows, and drive means driving said endless belt, oscillating said pivotally mounted side guides to laterally contact and release baked goods passing therebetween, and rotating said drums urging baked goods contacting said drums laterally.

2. The combination according to claim 1 wherein said conveyor section is a second conveyor section, and with the addition of a first conveyor section having a driven endless belt of rotatably mounted rollers, said endless belt having an upwardly inclined upper run receiving randomly disposed baked goods thereon, said first conveyor section delivering randomly disposed baked goods with small force to said second conveyor section.

3. The combination according to claim 2 with the addition of driven transfer rollers disposed between said first and said second conveyor sections.

4. The combination according to claim 3 wherein said first conveyor section has gently converging side guides narrowing the path of randomly disposed baked goods passing between said converging side guides to the distance between said pivotally mounted side guides of said second conveyor section.

5. The combination according to claim 4 wherein said pivotally mounted side guides have spring member guide portions with unsupported free ends contacting said baked goods.

6. The combination according to claim 5 wherein said longitudinal guides defining paths for aligned baked goods define paths tapering from about 1½ the diameter of the baked goods to substantially the diameter of the baked goods.

7. The combination according to claim 6 with the addition of a rotary paddle disposed over said second conveyor section in front of said pivotally mounted side guides knocking backward the uppermost of any stacked baked goods.

8. The combination according to claim 2 wherein said drive means includes a motor, a first shaft having cranks thereon, inverted "L" shaped pivotally mounted arms each having a horizontally extending portion and a downwardly extending portion, said downwardly extending portion being connected to said pivotally mounted side guides, connecting rods extending from said cranks to said horizontal portions of said "L" shaped arms oscillating said "L" shaped arms and said pivotally mounted side guides, and transmission means enabling said motor to drive said endless belt and said first shaft.

9. The combination according to claim 8 wherein said drive means has a second shaft extending over said endless belt and said vertically mounted drums, said second shaft being driven by said motor, and engaged pairs of bevel gears on said second shaft and said drums driving said drums.

10. The combination according to claim 2 wherein said second conveyor section is driven at a greater speed than said first conveyor section.